United States Patent [19]
Mowrer et al.

[11] Patent Number: 6,013,752
[45] Date of Patent: Jan. 11, 2000

[54] HALOGENATED RESIN COMPOSITIONS

[75] Inventors: Norman R. Mowrer, La Habra, Calif.; Rhonda L. Linz, Benton; Roland L. Gasmena, Little Rock, both of Ark.; Rudy Espinoza, Brea, Calif.; Christine L. Stanley, Anaheim, Calif.; Pritam S. Dhaliwal, Upland, Calif.

[73] Assignee: Ameron International Corporation, Pasadena, Calif.

[21] Appl. No.: 08/868,793

[22] Filed: Jun. 4, 1997

[51] Int. Cl.$^7$ .................................................. C08G 77/06
[52] U.S. Cl. ................... 528/26; 528/28; 528/29
[58] Field of Search ...................... 528/29, 26, 28

[56] References Cited

U.S. PATENT DOCUMENTS

| | | | |
|---|---|---|---|
| 3,244,664 | 4/1966 | Zelinski et al. | 260/41.5 |
| 3,959,203 | 5/1976 | Keil | 260/29.1 |
| 4,191,714 | 3/1980 | Yonezawa et al. | 525/102 |
| 4,238,375 | 12/1980 | Blount | 260/18 |
| 4,282,336 | 8/1981 | Yonezawa et al. | 525/102 |
| 4,414,364 | 11/1983 | McAlister | 525/437 |
| 4,739,013 | 4/1988 | Pinchuk | 525/101 |
| 4,992,521 | 2/1991 | Saho et al. | 528/14 |
| 5,210,133 | 5/1993 | O'Lenick, Jr. | 525/54.1 |
| 5,260,401 | 11/1993 | O'Lenick, Jr. | 528/26 |
| 5,360,869 | 11/1994 | DeSimone et al. | 525/102 |

*Primary Examiner*—Charles Nold
*Attorney, Agent, or Firm*—Christie, Parker & Hale, LLP

[57] ABSTRACT

Halogenated resin compositions are prepared without using halogen acids by combining at least one silicone intermediate, with an optional silane, an organic halogen-containing ingredient having functional groups selected from the group consisting of hydroxy, amine, and carboxyl groups, and a resin selected from the group consisting of hydroxy- and epoxy-functional resins. One or more amine curing agent and/or catalyst selected from the group consisting of organometallic compounds, acids, bases, and mixtures thereof can optionally be added to facilitate ambient temperature curing of the resulting composition. The combined ingredients undergo hydrolysis reactions to form a halogenated organooxysilane that condenses to form a cross-linked halogenated polysiloxane composition. The resin also reacts with the condensing halogenated organooxysilane to introduce itself into the cross-linked halogenated polysiloxane and, thereby form the halogenated polysiloxane resin composition. The composition is prepare without using an inorganic halogen acid, and is fully-cured at ambient temperature by exposure to atmospheric moisture to form a protective film, or alternatively a composite, having improved properties of chemical, abrasion, corrosion, weather, flame, and ultraviolet resistance.

36 Claims, 1 Drawing Sheet

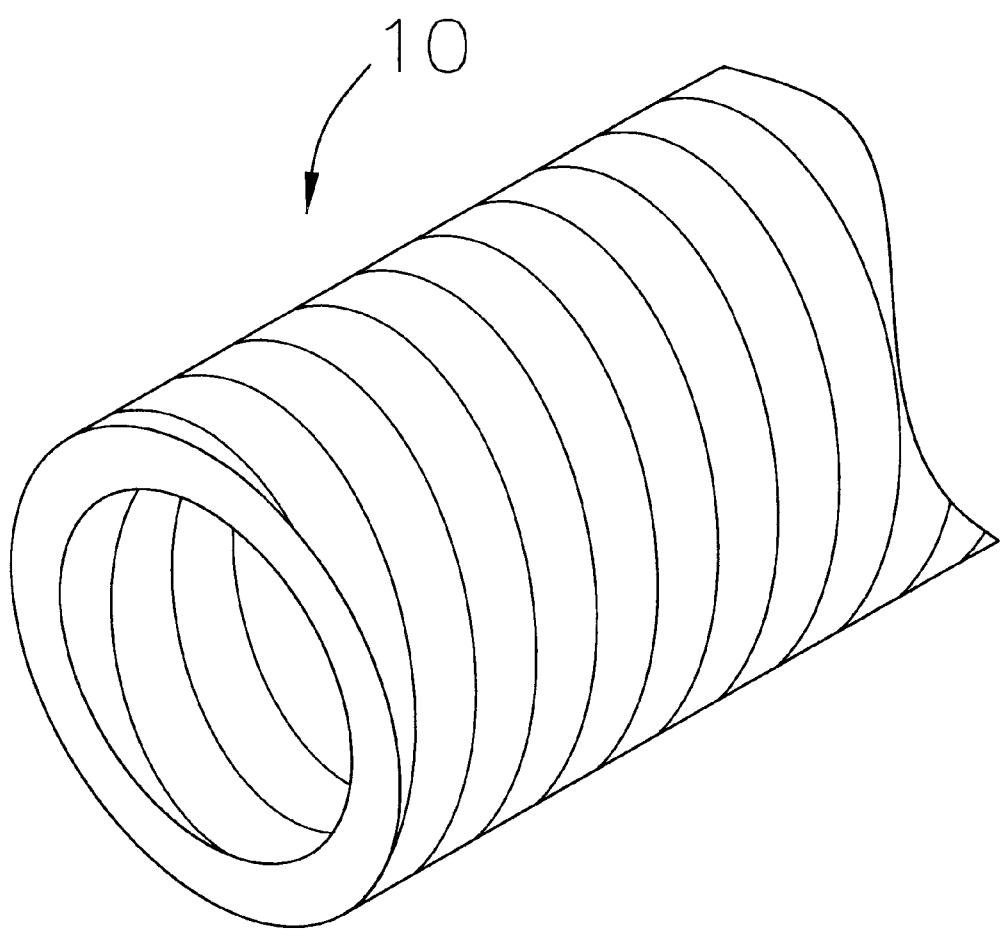

HALOGENATED RESIN COMPOSITIONS

FIELD OF THE INVENTION

This invention relates to halogenated resin compositions and methods for making the same, more particularly, to halogenated polysiloxane resin compositions formed without the use of halogen acids, that have improved properties of ultraviolet light, weather, chemical, corrosion, and abrasion resistance, fire resistance, hydrophobicity, and substrate adhesion.

BACKGROUND OF THE INVENTION

Halogenated resin compositions are useful in forming a variety of products such as protective coatings, mechanical structures and the like because of the excellent physical properties of chemical, corrosion, weather, and ultraviolet resistance that such compositions provide. Halogenated resin compositions that are prepared using silicon-containing polymers provide enhanced additional physical properties of flexibility and impact resistance to products formed therefrom, which are especially desirable in applications where the substrate or structure is subject to some degree of movement or flexing, or is subject to some degree of impact.

Halogenated resin compositions are conventionally prepared by reacting a designated polymer, such as a silicon-containing polymer, with an halogen acid. The halogen acid that is selected, e.g., hydrofluoric, hydrochloric, or hydrobromic acid, dictates which of the above-described properties will be improved. The halogen acid reacts with the designated polymer, causing one or more halogen groups to be introduced into the designated polymer, thereby forming a halogenated composition having one or more enhanced properties.

Halogen acids are known to be both highly corrosive and toxic and, therefore, the use of these acids to prepare halogenated compositions presents the possibility of both serious health danger and environmental hazard unless special precautions are taken. Besides possible health risks and environmental exposure, the additional steps and equipment needed to ensure the safety of handling such chemicals during the manufacturing process adds both to the cost of the process and the resulting product, and to the time needed to make the product.

Conventional halogenated resin compositions are useful, for example, as protective coatings on such substrates as metal, glass, and the like to provide an enhanced degree of chemical and weather protection. Such conventional halogenated resin compositions are typically spray-applied to the substrate, and are first diluted by organic solvent to facilitate the same. The use of organic solvents to dilute or thin chemical compositions has recently come under state and/or federal regulation due to the high volatile organic compound (VOC) content of such solvent-containing compositions and the related release of volatile constituents into the environment. Accordingly, the need exists for halogenated resin compositions formulated to conform with state and/or federal VOC regulations.

It is, therefore, desired that halogenated resin compositions be formulated in a manner that avoids the need to use potentially dangerous halogen acids. It is desired that such halogenated resin compositions so formed display equal or superior properties of chemical, corrosion, weather, heat and fire, and ultraviolet resistance when compared to halogenated resin compositions prepared using halogen acids. It is desired that such halogenated resin compositions be adapted for use as a protective coating and the like and conform with existing state and federal VOC regulations. It is further desired that such halogenated resin compositions be prepared using commercially available ingredients.

SUMMARY OF THE INVENTION

This invention provides halogenated polysiloxane resin compositions, and method for making the same, without the need for using halogen acids, and that display excellent properties of impact resistance, flexibility, chemical resistance, corrosion resistance, weather resistance, heat and fire resistance, abrasion resistance, ultraviolet resistance, hydrophobicity, and substrate adhesion.

Halogenated polysiloxane resin compositions are prepared, according to principles of this invention, by combining: at least one silicone intermediate selected from the group consisting of hydroxy- and alkoxy-functional silicone resins; with an optional silane selected from the group consisting of arylalkoxy silanes, alkylalkoxy silanes, halogenated silanes, and mixtures thereof; an organic halogen-containing ingredient having functional groups selected from the group consisting of hydroxy, amine, and carboxyl groups; and a resin selected from the group consisting of hydroxy- and epoxy-functional resins. If desired, an amine curing agent and/or an catalyst selected from the group consisting of organometallic compounds, acids, bases, and mixtures thereof are added to the mixture to facilitate reaction and ambient temperature curing of the resulting composition. In the event that the resin ingredient selected is an acrylic resin or polyester resin, the silicone intermediate may be an alkylalkoxy siloxane.

When combined in proper proportions, under proper mixing and temperature conditions, the silicone intermediate, optional silane and halogen-containing ingredients undergo hydrolysis and condensation reactions to form a halogenated organooxysilane that further condenses with itself and other hydrolyzed compounds to form a cross-linked halogenated polysiloxane composition. The resin ingredient condenses with the condensing halogenated organooxysilane to introduce itself into the cross linked halogenated polysiloxane polymer backbone, and thereby form the halogenated polysiloxane resin composition. The composition is prepared without using potentially dangerous inorganic halogen acids, and is fully-cured at ambient temperature by exposure to atmospheric moisture, or may be cured at elevated temperature.

BRIEF DESCRIPTION OF THE DRAWINGS

These and other features and advantages will become appreciated as the same become better understood with reference to the specification, claims and drawings wherein the enclosed FIGURE is an isometric view of a filament wound pipe comprising filament bonded with a halogenated polysiloxane resin composition prepared according to principles of this invention.

DETAILED DESCRIPTION

This invention relates to halogenated polysiloxane resin compositions that are prepared by combining a halogen-containing compound with at least one silicone intermediate. The halogenated polysiloxane resin compositions are formed without the use of halogen acids and can be used for coatings, adhesives, composites and the like, or may be further combined with organic polymers such as epoxy, acrylic, polyester, and phenolic resins and the like to form halogenated polysiloxane polymer resin compositions.

Halogenated polysiloxane resin compositions, prepared according to principles of this invention, display equal or superior properties of chemical, corrosion, weather, heat and fire, and ultraviolet resistance when compared to halogenated resin compositions prepared using halogen acids.

Halogenated polysiloxane resin compositions are prepared without the need to use halogen acids by combining:
(a) one or more an optional silanes; with
(b) at least one hydroxy- or alkoxy-functional silicone intermediate;
(c) a hydroxy-functional or epoxy-functional resin; and
(d) an organic halogen-containing ingredient; with the following optional ingredients including:
(i) an amine curing agent; and
(ii) at least one catalyst.

Solvents, conventional fillers and pigments, plasticizers, flow control additives, wetting agents and the like may also be added to the composition to provide desired properties for certain applications. Generally speaking, the ingredients are combined and undergo hydrolysis and polycondensation reactions to produce a halogenated organooxysilane polymer that reacts with the resin ingredient to form a halogenated polysiloxane resin composition.

With respect to the optional silane ingredient, useful silanes include those selected from the group including alkylalkoxy silanes, arylalkoxy silanes, halogenated silanes, and mixtures thereof. In an exemplary embodiment, halogenated acrylic or polyester polysiloxane resin compositions are prepared by using an arylalkoxy silane. Suitable arylalkoxy silanes include those having the general formula

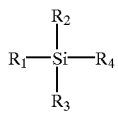

where $R_1$ is an aryl group, where each $R_2$, $R_3$ and $R_4$ is an alkoxy group having less than about four carbon atoms, where each $R_2$, $R_3$ and $R_4$ group can be the same or different, and that has an average molecular weight in the range of from about 150 to 300. A preferred arylalkoxy silane is one where each $R_2$, $R_3$ and $R_4$ is a methoxy group to facilitate hydrolysis and condensation reaction. A particularly preferred arylalkoxy silane is phenyltrimethoxy silane available from, for example, Dow Corning, of Midland, Mich. under the product name Z-6124; and a mixture of phenyltrimethoxy silane and phenylmethyldimethoxy silane available from, for example. Wacker Silicones Corporation of Adrian, Mich. under the product name SY-201.

The arylalkoxy silane ingredient is used to enhance compatibility between the acrylic resin or polyester resin and the other organic chemical ingredients, and to improve the temperature resistance of the final composition. A preferred halogenated acrylic or polyester polysiloxane resin composition is prepared by using up to about 15 percent by weight of the arylalkoxy silane based on the total weight of the composition. Using greater than about 15 percent by weight of the arylalkoxy silane can produce a finally cured composition that may be too soft for certain applications, such as protective coatings, and can produce a coating having surface defects, such as pinholes.

Although the use of such arylalkoxy silanes are understood to be useful when preparing halogenated acrylic or polyester embodiments of the polysiloxane resin compositions, they can be optionally used when preparing halogenated epoxy or phenolic polysiloxane compositions up to about eight percent by weight based on the weight of the total composition.

Halogenated polysiloxane compositions of this invention may also be prepared by using an alkylalkoxy silane. It is to be understood that the alkylalkoxy silane can either be used alone to prepare halogenated acrylic and polyester polysiloxane resin compositions, or can be used in combination with the arylalkoxy silane to prepare halogenated epoxy and phenolic polysiloxane resin compositions. Suitable alkylalkoxy silanes include those having the general formula

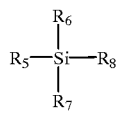

where $R_5$ is an alkyl group having less than four carbon atoms, where each $R_6$, $R_7$ and $R_8$ is an alkoxy group having less than four carbon atoms, where each $R_6$, $R_7$ and $R_8$ group can be the same or different, and where the alkylalkoxy silane has an average molecular weight in the range of from about 100 to 300. A preferred alkylalkoxy silane is one where each $R_6$, $R_7$ and $R_8$ group is a methoxy group to facilitate hydrolysis and condensation reaction. A preferred alkylalkoxy silane is methyltrimethoxy silane available from, for example, OSI Specialties of Tarrytown, N.Y. under the product name Silquest A-163; Dow Corning, under the product name Z-6070; and Huls America of Pitscataway, N.J. under the product name Dynasylan MTMS.

The alkylalkoxy silane is used in preparing the halogenated resin composition to improve the chemical resistance and hydrophobicity of the final composition, and to moderate the influence of any arylalkoxy silane also being used. A preferred halogenated resin composition is prepared by using up to about 15 percent by weight of the alkylalkoxy silane based on the total weight of the composition, and more preferably up to about ten percent by weight of the alkylalkoxy silane. Using greater than about 15 percent by weight of the alkylalkoxy silane can produce a cured coating that is too brittle for certain applications, such as for protective coatings.

Halogenated polysiloxane compositions of this invention may also be prepared by using a halogenated silane. It is to be understood that the halogenated silane can be used in combination with or independent of either or both of the alkylalkoxy silane and arylalkoxy silane to prepare halogenated polysiloxane resin compositions. Suitable halogenated silanes include fluorinated and chlorinated silanes having less than about 15 carbon atoms. Such halogenated silanes are desired because they improve the abrasion resistance, chemical resistance, hydrophobicity, weather resistance and flame retardancy of the final composition.

A preferred halogenated silane is 1,1,1-trifluoropropyltrimethoxy silane available from, for example, Dow Corning under the product name Q3-9030. The halogenated silane is used in preparing the halogenated resin composition to improve the abrasion resistance and weatherability of the final composition. Up to about 15 percent by weight of the halogenated silane, based on the total weight of the composition, can be used to prepare the halogenated polysiloxane resin compositions of this invention, and more preferably up to about ten percent by weight of the halogenated silane. Using more than about 15 percent by weight of the halogenated silane is not desired because it can cause the finally cured composition to be too brittle.

With respect to the silicone intermediate ingredient, suitable silicone intermediates are those selected from the group including hydroxy and alkoxy-functional silicone intermediates. It is to be understood that one or more different silicone intermediates can be used to form halogenated polysiloxane resin composition of this invention, and the type or types that are selected depend on the type of hydroxy- or epoxy-functional resin that is used. Suitable hydroxy- and alkoxy-functional silicone intermediates include those having the general formula

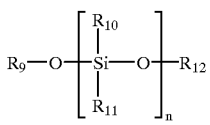

where each $R_{10}$ and $R_{11}$ is independently selected from the group consisting of the hydroxy group, alkyl, aryl and alkoxy groups having up to about six carbon atoms, where each $R_9$ and $R_{12}$ is independently selected from the group consisting of hydrogen, and alkyl and aryl groups having up to about 12 carbon atoms, and where "n" is selected so that the weight average molecular weight of the silicone intermediate is in the range of from about 100 to 10,000.

It is desired that at least one of the $R_{10}$ and $R_{11}$ groups be alkoxy or hydroxy groups to facilitate hydrolysis and condensation reactions. In the event that the $R_{10}$ and $R_{11}$ groups are alkoxy groups, it is desired that each $R_{10}$ and $R_{11}$ group be limited to about six carbon atoms to facilitate rapid evaporation of the analog alcohols formed during hydrolysis, to thereby drive the hydrolysis and polycondensation reactions to completion. When high heat or temperature resistance is desired, some of the $R_{10}$ and $R_{11}$ groups are phenyl.

Preferred hydroxy- and alkoxy-functional silicone intermediates are those available, for example, from Dow Corning, under the product names DC-804, DC-840, DC-Z6018, DC1-2530, DC6-2230, DC-3037, DC-3074, Q1-2530 (hydroxy-functional phenylmethyl silicone intermediate), and Q1-2230 (methoxy-functional methyl phenylmethyl silicone intermediate); and from Wacker Silicones under the product names SY-231 (phenylmethyl silicone intermediate), SY-550 and SY-430.

The hydroxy- and alkoxy-functional silicone intermediates are used in preparing the halogenated resin composition because they provide desired performance characteristics of inorganic chemical compounds, such as improved properties of heat, chemical and weather resistance, and improved hydrophobicity. A preferred halogenated polysiloxane resin composition is prepared by using in the range of from 10 to 70 percent by weight of the hydroxy- and alkoxy-functional silicone intermediate ingredient based on the total weight of the composition, and more preferably in the range of from about 15 to 45 percent by weight of the hydroxy- and alkoxy-functional silicone intermediate.

Using less than about ten percent by weight of the hydroxy- and alkoxy-functional silicone intermediates can produce a halogenated polysiloxane resin composition that will lack a desired degree of chemical, heat and weather resistance. Using greater than about 70 percent by weight of the hydroxy- and alkoxy-functional silicone intermediates can produce a halogenated polysiloxane resin composition that may be too brittle or hard for practical used as a protective coating.

In the event that the hydroxy- or epoxy-functional resin is an acrylic or polyester resin, a desired alkoxy-functional silicone intermediate is one having the general formula

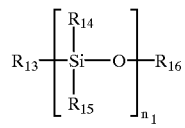

where $R_{13}$ may be selected from the alkyl, aryl, and alkoxy groups, where $R_{14}$ and $R_{15}$ may each be selected from the alkyl, aryl, and alkoxy groups, where $R_{16}$ may be selected from the alkyl group, and where "$n_1$" is selected so that the siloxane resin has a weight average molecular weight in the range of from about 500 to 5,000. It is desired that each $R_{13}$, $R_{14}$, $R_{15}$ and $R_{16}$ group have less than about six carbon atoms to both minimize steric hindrance, with respect to $R_{13}$ and $R_{16}$, and to facilitate hydrolysis and condensation reactions by forming relatively volatile alcohol analogs, with respect to $R_{14}$ and $R_{15}$.

Preferred alkoxy-functional silicone intermediates for preparing halogenated hydroxy- or epoxy-functional polysiloxane resin compositions are alkylalkoxy siloxanes. A particularly preferred alkylalkoxy siloxane is one where $R_{13}$ is a methoxy group, $R_{14}$, $R_{15}$ and $R_{16}$ are each methyl groups. A particularly preferred methylmethoxy siloxane is one available, for example, from Wacker Silicones under the product name Silres MSE-100 (methoxy-functional methyl siloxane ester).

The alkylalkoxy siloxane is useful for forming halogenated acrylic and polyester polysiloxane resin compositions because it contributes to the hardness of the finally cured composition. The alkylalkoxy siloxane may optionally be used to form halogenated polysiloxane resin compositions where the hydroxy- or epoxy-functional resin is an epoxy or phenolic resin to further improve weather and chemical resistance, and the hydrophobicity of the final composition. It is to be understood that alkylalkoxy siloxane ingredient can be used alone or in combination with one or more of the hydroxy-functional silicone intermediates and other alkoxy-functional silicone intermediates described above. In a preferred embodiment, up to about 25 percent by weight of the alkylalkoxy siloxane ingredient, based on the total weight of the composition, can be used to prepare halogenated polysiloxane resin compositions of this invention, and more preferably up to about 20 percent by weight of the alkylalkoxy siloxane ingredient.

It is to be further understood that the total amount of silicone intermediate ingredients used to prepare halogenated polysiloxane resin compositions of this invention is in the range of from about 10 to 70 percent by weight based on the total weight of the composition, and more preferably in the range of from about 10 to 50 percent by weight.

With respect to the hydroxy- or epoxy-functional resin ingredient, suitable hydroxy-functional resin ingredients are carbinols selected from the group including acrylic resins, polyester resins, phenolic resins, phenolic silane resins, and mixtures thereof.

Suitable carbinols include partially esterified or otherwise modified carbinols that have at least two free hydroxy groups per molecule to facilitate participation in polymerization reactions with silane-containing ingredient(s) of this invention. Other hydroxy-bearing materials may be present and may or may not react with the optional silane ingredients, or silicone intermediate(s). Thus the carbinol-silane reaction mixture may contain a monohydroxy reactant such as an alkanol or the like, and such monohydroxy material may be mixed with the carbinol, silane or silicone intermediate during or after the time the latter is formed.

The polyol or monohydroxy materials may have a weight average molecular weight of up to about 10,000 or more, especially if they are polyoxalkyl carbinols such as the polyoxalkyl glycols or alkyl-capped polyalkoxysilane polyols. The lowest molecular weight possible for the polyol material is approximately 62, the molecular weight of ethylene glycol. Higher molecular weight polyols are usually a minor molar amount of the total carbinol employed, with the lower molecular weight carbinol being the major amount.

Suitable carbinols include ethylene glycol, propylene glycol, diethylene glycol, trimethylene glycol, triethylene glycol, dipropylene glycol, tripropylene glycol, polyethylene glycols, trimethyl propanol, 1,6- or 2,6-hexanediol, neopentyl glycol, 1,3-butylene glycol, pentaerythritol, hexylene glycol, partially-esterified polyols, cyclopentanediol, polytrimethylene ether glycols (weight average molecular weight "WAMW" 650–2,900), polypropylene ether glycols (WAMW 400–4,000), castor oil and castor oil derivative (WAMW 300–1,000), polycaprolactone glycols (WAMW 300–2,000), hydroxy-terminated polybutadienes (WAMW 500–2,000), hydroxy-functional bisphenol A polyols and polycarbonate glycols (WAMW 500–2,500), polybutylene ether glycols (WAMW 400–4,000), polyoxyethylene-propylene copolymer ether glycols (WAMW 400–4,000), and the like. Mixtures of these polyols may also be reacted, especially those which contain a major portion of ethylene glycol, propylene glycol or glycerol.

The preferred carbinols comprise hydroxy-functional acrylic resins, alkyd resins or polyester resins or carboxylic acid functional acrylic resins, epoxy resins, or polyester resins. Particularly preferred carbinols are acrylic and polyester resins having equivalent weights in the range of from about 200 to 1,000, with weight average molecular weights up to about 10,000. Example carbinols are commercially available from a variety of sources and include the acryloid acrylic resins from Rohm and Haas of Philadelphia, Pa.; the Joncryl series acrylic resins CDX-500, 586, 587, 588, 611, 678, etc., from S. C. Johnson & Sons, Inc., Racine, Wis.; polyester resins from Miles, Inc., of Pittsburgh, Pa., sold under the product name Desmophen 651, 800, 1100, 1300, 1700, etc. Polyester resins are also commercially available from Cargill, Witco under the product names 5789, 5776 and 5782, and from Ruco Polymer Corporation under the product names S-105, F-2300 and F-2310.

Such carbinols are selected to achieve desirable properties in the finally-cured composition and because they may often make a less costly composition than one comprising entirely silanes and silicone intermediates. The carbinols may be advantageous for increasing adhesion of a binder or coating to some substrates or changing mechanical properties of a finally-cured composition. Generally speaking, a high-molecular weight carbinol will have good impact resistance and flexibility. Carbinols with high hydroxy functionality will be less flexible but will have excellent chemical resistance. Acrylic or polyester carbinols will have better resistance to ultraviolet light and weathering than the bisphenol A or polycarbonate carbinols.

Suitable phenolic resins useful for preparing halogenated polysiloxane resin compositions of this invention are selected from the group including modified and nonmodified phenolic resoles and novolacs. The phenolic resin ingredient may already be in polymer form, such as phenolic resole and novolac resins, or may formed in situ when all of the ingredients are combined by combining phenol, or substituted phenol, with an aldehyde in the presence of a strong acid, if forming a phenolic novolac, or a strong base, if forming a phenolic resole. Use of the phenolic resin is desired to produce a halogenated resin composition having increased temperature and/or flame resistance for coatings, composites, adhesives or other types of applications that demand the same.

Phenolic novolacs found most useful in forming the halogenated resin composition include those having a weight average molecular weight in the range of from about 400 to 5,000. Useful phenolic resoles include those that have a weight average molecular weight in the range of from about 300 to 3,000. Such phenolic resins are commercially available from, for example, B.P. Chemical Division of British Petroleum of Barry, U.K.; the Packaging and Industrial Products Division of Borden, Inc., of Columbus, Ohio, the Durez Division of Occidental Petroleum of Dallas, Tex.; Georgia-Pacific Corporation of Atlanta, Ga.; and Neste Resins Corporation of Eugene, Oreg. Preferred phenolic resins include B.P. Chemical's Cellobond J2018L and J2027L; Bordon's SL-898 phenolic resole; and Georgia-Pacific's GP5018 phenolic resole.

Examples of epoxy-functional resins useful for forming halogenated resin compositions according to this invention include epoxy resins that contain more than one and preferably two 1,2-epoxide groups per molecule. Epoxy resins having more than two 1,2-epoxide groups per molecule are useful where improved chemical and corrosion resistance is desired. Preferably, the epoxy resins are liquid rather than solid, have an epoxide equivalent weight of about 100 to about 500, and have a reactivity of about two. Epoxy resins that do not contain aromatic groups are useful in applications where good ultraviolet resistance and weatherability are desired.

Preferred epoxy resins are non-aromatic hydrogenated cyclohexane dimethanol and diglycidyl ethers of hydrogenated Bisphenol A-type epoxide resin, such as Eponex 1510, Heloxy 107 and Eponex 1513 (hydrogenated bisphenol A-epichlorohydrin epoxy resin) from Shell Chemical in Houston, Tex.; Santolink LSE-120 from Monsanto located in Springfield, Mass.; Epodil 757 (cyclohexane dimethanol diglycidylether) from Air Products and Chemicals, Inc., located in Allentown, Pa.; Araldite XUGY358 and PY327 from Ciba Specialty Chemicals located in Hawthorne, N.Y.; Epirez 505 from Shell Chemical Company located in Louisville, Ky.; Aroflint 393 and 607 from Reichhold located in Pensacola, Fla.; and ERL4221 from Union Carbide located in Tarrytown, N.Y. Other suitable non-aromatic epoxy resins include DER 732 and DER 736 available from Dow Chemical Company.

In a preferred embodiment, in the range of from 10 to 70 percent by weight of the hydroxy- or epoxy-functional resin ingredient, based on the total weight of the composition, is used to form halogenated polysiloxane resin compositions of this invention. More preferably, in the range of from about 10 to 25 percent by weight of the hydroxy- or epoxy-functional resin ingredient is used. If the amount of hydroxy- or epoxy-functional resin ingredient that is used is outside of this range, the resulting halogenated polysiloxane resin composition may not have the desired physical or chemical properties for a particular application. For example, if less than about ten percent by weight of an hydroxy-functional resin is used, the resulting halogenated resin composition will have a reduced desired degree of ultraviolet and weather resistance. If less than about ten percent by weight of an epoxy resin is used, the resulting halogenated resin composition will have a reduced degree of flexibility and impact resistance. If less than about ten percent by weight of a phenolic resin is used, the resulting halogenated resin composition will have a reduced degree of temperature and flame resistance. If more than about 70 percent by weight of the hydroxy-functional or epoxy-functional resin ingredient is used, the amount of the other silicon-containing ingredients is necessarily reduced, producing a halogenated polysiloxane resin composition that may have a reduced degree of chemical and corrosion resistance, adhesion, abrasion resistance, impact resistance and flexibility.

With respect to the organic halogen-containing ingredient, suitable halogenated ingredients include fluorinated, chlorinated and brominated compounds that have a reactive hydroxy, amine or carboxyl group, i.e., have hydroxy-, amino-, or carboxy-functionality. It is important to note that the term "organic", as used to describe the halogen-containing ingredient, is intended to exclude inorganic halogen acids from the group of halogen-containing ingredients that are used to form halogenated resin compositions of this invention. Halogenated inorganic acids are, therefore, specifically avoided and are not used to prepare halogenated polysiloxane resin composition of this invention. Hydroxy-functional organic halogenated compounds are preferred because the resulting Si—O—C bond that is formed during polymerization is more stable than the C—N—Si bond produced by amine functionality.

Preferred hydroxy-functional organic halogenated compounds include fluoroalcohols, chloroalcohols, and bromoalcohols. Fluoroalcohols are especially preferred because they provide improved ultraviolet light resistance and hydrophobicity to the final composition. Preferred fluoroalcohols have in the range of from about one to ten carbons atoms to facilitate polycondensation and permit grafting onto the silicone backbone.

Suitable fluoroalcohols include trifluoroethanol, difluoroethanol, hexafluoropropanol, heptafluorobutanol, heptafluoropentanol, hexafluoroisopropanol, methyltrifluorobutanol, octafluoropentanol, perfluorodecanol, 2,2-difluoroethanol, 1H,1H,7H-dodecafluoro-1-heptanol, 3,3,4,4,5,5,5-heptafluoro-2-pentanol, 2,2,3,4,4,4-hexafluorobutan-1-ol, hexafluoroisopropanol, hexafluoro-2-methylisopropanol, 2-methyl-4,4,4-trifluorobutanol, 1H,1H,5H-octafluoro-1-pentanol, 1H,1H-pentafluoropropanol-1,1,1,1,3,3,3-hexafluoropropanol, perfluoro-tert-butanol, 1H,1H,2H-perfluorodecanol, 1H,1H-perfluoro-1-heptanol, 1H,1H-heptafluoro-1-butanol, 2,2,3,3-tetrafluoro-1-propanol, 2,2,2-triflurorethanol, 1,1,1-trifluoro-2-octanol, 1,1,1-trifluoropropanol-2,3,3,3-trifluoropropanol-1. Preferred fluoroalcohols are commercially available from, for example, 3M Chemical Co., St. Paul, Minn., under the product names L-9704 and FC-10; and Dupont Chemical of Wilmington, Del., under the product name Zonyl BA-L.

A particularly preferred fluoroalcohol is 2,2,2-trifluoroethanol because of its lower cost and ready availability, and also because of its efficient placement and use of fluorine groups.

Suitable chloroalcohols are those selected from the group including but not limited to 1,1,1-trichloroethanol, 2,2,2-trichloroethanol, 2,2-dihydroxy 3,3,3-trichloroproprionic acid, and 1,1,1-trichloro 2-methyl 2-propanol. The use of chloroalcohols is desired in those applications where improved hydrophobicity, chemical resistance and flame resistance are desired.

Suitable bromoalcohols are those selected from the group including but not limited to 2,3-dibromoproprionic acid, 1,3-dibromopropanol, 1,4-dibromo 2,3-butanediol, and 2,3-dibromo 1,4-butanediol. The use of bromoalcohols is desired in those applications where improved flame resistance is desired.

The organic halogen-containing ingredient is used to introduce one or more halogen atoms into the polysiloxane polymer formed by hydrolysis and/or polycondensation of the silicone intermediate(s) and the silane. A preferred halogenated polysiloxane resin composition is prepared by using in the range of from 5 to 25 percent by weight of the organic halogenated ingredient based on the total weight of the composition. Using less than about five percent by weight of the halogenated ingredient can produce a halogenated resin composition that may have reduced properties of chemical, abrasion, flame and weather resistance, and hydrophobicity. Using greater than about 25 percent by weight of the halogenated ingredient can produce a halogenated resin composition that may either be too hard or too soft for practical use in certain applications, and may produce a resin composition that does not cure well and that has poor adhesion.

With respect to the amine curing agent, suitable compounds useful for facilitating the hydrolysis and/or polycondensation reactions of the silicone intermediate and/or the hydroxyl- and epoxy-functional resin include amines selected from the general classes of aliphatic amines, aliphatic amine adducts, polyamidoamines, cycloaliphatic amines and cycloaliphatic amine adducts, aromatic amines, Mannich bases and ketimines, which may be substituted wholly or in part with an aminosilane. Preferred amine curing agents include aminosilanes having the general formula

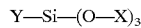

where Y is $H(HNR_{17})_a$ and "a" is an integer from two to seven, where each $R_{17}$ is a difunctional organic radical independently selected from the group consisting of aryl, alkyl, dialkylaryl, alkoxyalkyl, and cycloalkyl radicals, and $R_{17}$ can vary within each Y molecule, and where each X can be the same or different, and is limited to alkyl, hydroxyalkyl, alkoxyalkyl and hydroxyalkoxyalkyl groups containing less than about six carbon atoms. If desired, more that one aminosilane can be used in preparing halogenated polysiloxane resin compositions of this invention.

Preferred aminosilanes include, but are not limited to: aminoethylaminopropyltriethoxysilane, aminoethylaminopropyl-trimethoxysilane. n-phenylaminopropyl trimethoxysilane, trimethoxysilylpropyl diethylene triamine, 3-(3-aminophenoxy)propyl trimethoxy silane, aminoethylaminomethylphenyltrimethoxy silane, 2-aminoethyl 3-aminopropylsilane, tris 2-ethylhexoxy silane, n-aminohexyl aminopropyl trimethoxy silane and trisaminopropyl trismethoxy ethoxy silane.

The manufacturers and trade names of some aminosilanes useful in the present invention are listed in Table 1

TABLE 1

| Manufacturer | Aminosilanes Product Designation |
|---|---|
| Dow Corning | Z6020, XI-6100, XI6150 |
| Union Carbide | A1100, A1101, A1102, A1108, A1110, A1120, A1126, A1130, A1387, Y9632 |
| Wacker | ED117 |
| Hüls | A0696, A0698, A0699, A0700, A0710, A0720, A0733, A0733, A0742, A0750, A0800 |
| PCR | 12328-1 |

The halogenated polysiloxane resin composition is prepared by using up to about 20 percent by weight of the amine curing agent based on the total weight of the composition, and more preferably up to about 12 percent by weight of the amine curing agent. A halogenated resin composition prepared by using greater than about 20 percent by weight of the amine curing agent can form resin compositions that are highly cross linked and that have poor impact resistance, flexibility, weatherability, and shelf life.

Another class of compounds useful as a catalyst to facilitate hydrolysis and polycondensation reactions, and thereby reduce reaction time and elevated reaction temperatures, are selected from the group consisting of organometallic compounds, acids, bases, and mixtures thereof. If desired, more than one type of organometallic catalyst can be used. Useful organometallic compounds include metal driers well known in the paint industry such as zinc, manganese, cobalt, iron, lead and tin octoate, neodecanates and naphthenates, and the like. Organotitanates such as butyl titanate and the like are also useful in the current invention.

Organometallic compounds useful as a catalyst for forming halogenated resin compositions include those having the general formula

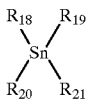

where $R_{18}$, $R_{19}$, $R_{20}$ and $R_{21}$ groups are selected from the group consisting of alkyl, aryl, aryloxy, and alkoxy groups having up to 11 carbon atoms, and where any two of $R_{18}$, $R_{19}$, $R_{20}$ and $R_{21}$ groups are additionally selected from a group consisting of inorganic atoms consisting of halogen, sulfur and oxygen.

Example organotin compounds include tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis (isooctylthioglycolate), butyltin trichloride, butylstannoic acid, dioctyltin dichloride, dioctyltin oxide, dioctyltin dilaurate, dioctyltin oxide, dioctyltin dilaurate, dioctyltin maleate polymer, dioctyltin bis (isooctylthioglycolate), dioctyltin sulfide, dibutyltin diacetylacetonate, and dibutyltin 3-mercapto propionate. Preferred organometallic compounds are commercially available from, for example, Nitto Kasei Co., Ltd under the product name U-220; OSI Specialties under the product name NIAX Catalyst U-220 (dibutyltindiacetyl acetonate); and Air Products and Chemicals, Inc., under the product name METACURE T-1.

The halogenated polysiloxane resin compositions are prepared by using up to about ten percent by weight of the organometallic catalyst based on the total weight of the composition, and more preferably up to about four percent by weight of the organometallic catalyst. A halogenated polysiloxane resin composition prepared by using greater than about ten percent by weight of the organometallic catalyst can form compositions having a greater degree of flexibility than otherwise desired. While it is to be understood that the use of the amine curing agent and organometallic catalyst are optional, preferred embodiments of halogenated polysiloxane resin compositions are prepared by using both aminosilane and organometallic catalysts up to the amounts previously described for each.

If desired, one or more organic solvents can be used to solubilize the other organic ingredients to facilitate hydrolysis and polycondensation reactions, and to facilitate application and control film thickness of the composition. Preferred solvents include volatile solvents having a relative low VOC content to permit quick drying of the halogenated resin composition when applied as a coating. Example solvents that can be used include oxygenated solvents such as esters, ethers, alcohols, ketones, glycols, and aromatic solvents such as toluene, xylene, etc.

Specific solvents include for example, MIBK, MEK, acetone, n-propyl ketone, methyl isoamyl ketone, methyl propyl ketone, isopropanol, isobutyl alcohol, n-butyl alcohol, ethylene glycol monobutyl ether, propylene glycol monobutyl ether, triethylamine, n-butyl acetate, ethyl 3-ethoxypropionate, pentanone, etc. The halogenated resin composition may contain up to about ten percent by weight solvent.

Halogenated polysiloxane resin compositions of this invention may also include conventional fillers such as silica powder, talc (magnesium silicate), clays such as china clay (aluminum silicate), wollastonite (calcium silicate), calcium carbonate, barites (barium sulfate, barium metaborate), aluminum trihydrate, aluminum oxide, graphite, zinc, aluminum, copper, mica, micaceous iron oxide, alumina flake, calcined alumina, glass flake, and stainless steel flake.

Pigments such as iron oxide, aluminum oxide, titanium dioxide, and chrome green may also be used. Pigments containing lead should be avoided because of interference with cure. Organic pigments such as hansa yellow, phthalo green, and phthalo blue may also be used to color the product. Zinc oxide can also be used to aid film hardening. Barium metaborate is a preferred filler when the resistance to acids is desired because it has been found that coating compositions containing barium metaborate exhibit improved resistance to attack by acid.

When a composition exhibiting resistance to high temperatures is desired, a finely divided, particulate pigment or filler can be used. Examples of such fillers providing high heat resistance are barites (barium sulfate), mica, micaceous iron oxide, aluminum flake, aluminum oxide, calcined alumina, glass flake, stainless steel flake, and the like. By proper selection of the binder and filler, heat stable coatings resistant to temperatures exceeding 1000° F. can be achieved.

Other commonly used materials and additives, such as plasticizers, adhesion improvers, flow control additives, wetting agents for pigment dispersion, and thixotropic agents such as fumed silica may also be included. For example, to improve the adhesion of the composition to a substrate a catalytic amount, up to about one percent by weight of the total composition, of an adhesion improver can be used. If desired, up to about 50 percent by weight, based on the total weight of the composition, of such fillers, pigments, materials and additives can be used.

Example halogenated acrylic and polyester polysiloxane resin compositions of this invention are prepared by combining together a silicone intermediate, an optional arylalkoxy silane, an optional organometallic catalyst, and an optional amine curing agent to form a first mixture and heating the mixture for a period of time. An optional alkylalkoxy silane, an optional second arylalkoxy silane, and a second silicone intermediate are added to the first mixture to form a second mixture and heated. A third and fourth silicone intermediate, organic solvent, halogen-containing alcohol, acrylic or polyester resin, and optional second organometallic catalyst are added to the second mixture to form the final product.

Example halogenated epoxy and phenolic polysiloxane resin compositions of this invention are prepared by combining an organic halogen-containing ingredient, a silicone intermediate, an optional organometallic catalyst to form a first mixture and heating the mixture for a period of time. An optional arylalkoxy silane, a second silicone intermediate, and an epoxy or phenolic resin were added are added to the first mixture to form a second mixture and cooled to a desired temperature. An optional second organometallic catalyst and an optional aminosilane are added to the second mixture and mixed until uniform to form the final product.

In example embodiments, the resulting halogenated polysiloxane resin compositions are stored in a single container, and are sold as a single-part system. Prior to application, the container is opened and the composition is finally cured by exposure to atmospheric moisture, which moisture along with the presence of the catalyst drives hydrolysis and polycondensation reactions to completion. Alternatively, halogenated resin compositions of this invention can be prepared as two-part systems by providing some or all of the curing agents and catalysts in a second container that is mixed together with the contents of a first container before application.

While not wishing to be bound by any particular theory or mechanism, it is believed that halogenated hydroxy-functional polysiloxane resin compositions of this invention are produced in the following manner. Upon combining ingredients, it is believed that the silicone intermediates undergo a controlled degree of hydrolysis, and the optional silane, hydrolyzed silicone intermediates, and the hydroxy-functional halogenated ingredient undergo polycondensation reactions to form a halogenated organooxysilane having residual silanol groups. During the polycondensation reactions, the optional silane and hydrolyzed silicone intermediates also condense with themselves to form a cross-linked polysiloxane network. During the polycondensation reactions the hydroxy-functional resin condenses with itself to form a resin polymer, and condenses with the silanol groups of the halogenated organooxysilane, thereby introducing the resin into the halogenated polysiloxane network to form the halogenated polysiloxane resin composition.

It is also believed that halogenated epoxy-functional polysiloxane resin compositions of this invention are produced in the following manner. Like the hydroxy-functional polysiloxane resin composition embodiment described above, upon combining ingredients the silicone intermediates undergo a controlled degree of hydrolysis, and the optional silane, hydrolyzed silicone intermediates, and the hydroxy-functional halogenated ingredients undergo polycondensation reactions to form a halogenated organooxysilane having residual silanol groups. During the polycondensation reactions the optional silane and hydrolyzed silicone intermediates also condense with themselves to form a cross-linked polysiloxane network.

During the polycondensation reactions, the epoxy reacts with the optional aminosilane curing agent to form a cured epoxy resin polymer with pendant alkoxy functionality. The alkoxy functionality on the epoxy resin is hydrolyzed in the presence of water and condenses with the silanol groups of the halogenated organooxysilane, thereby introducing the resin into the halogenated polysiloxane network and forming the halogenated polysiloxane resin composition.

A key feature of this invention is that it permits halogenation of the resin without the need for using inorganic halogen-containing acids, such as hydrofluoric acid and the like, by reacting the resin with the condensation product of a hydroxy-, amine- or carboxy-functional organic halogen-containing compound and an organooxysilane.

The following examples are presented for purposes of illustrating different embodiments of halogenated polysiloxane resin compositions prepared according to principles of this invention.

EXAMPLE NO. 1

Fluorinated Acrylic Polysiloxane Resin Composition

A fluorinated acrylic polysiloxane resin composition was prepared by combining approximately 100 g of an alkylalkoxy siloxane (Silres MSE 100), 20 g of a first arylalkoxy silane (Z-6124), 4 g of an organometallic catalyst (NIAX U-220), and 15 g of aminosilane (Z6020) to form a first mixture. The first mixture was heated to a temperature of approximately 150° F. and mixed for a period of about 30 minutes. Approximately 50 g of an alkylalkoxy silane (A-163 and Z6070), 80 g of a second arylalkoxy silane (SY-201), 150 g of a first alkoxy-functional silicone intermediate (DC3074 and SY-231) were each added to the first mixture and refluxed for about one hour at a temperature of approximately 180° F.

Approximately 25 g of a second alkoxy-functional silicone intermediate (DC6-2230), 25 g of a first organic solvent (PM Acetate), and 15 g of a second organic solvent (butyl acetate) were slowly added to the refluxed mixture. Approximately 160 g of an acrylic resin (CDX-588), 35 g of a hydroxy-functional silicone intermediate (Q1-2530), 80 g of 2,2,2-trifluoroethanol, and 2 g of the organometallic catalyst were added to the mixture and the mixture was refluxed for a period of approximately two hours at a temperature of about 180° F. Approximately 435 g of a white pigment and 30 g of the first organic solvent was added to the refluxed mixture to create a white fluorinated acrylic polysiloxane resin composition.

EXAMPLE NO. 1A

Fluorinated Acrylic Polysiloxane Resin Composition

A fluorinated acrylic polysiloxane resin composition was prepared in the manner described above in Example No. 1, except that the approximately 50 g of an alkylalkoxy silane (A-163 and Z6070) was replaced with 60 g of fluorinated silane (Q3-9030) for purposes of achieving further improvement in abrasion and weather resistance.

EXAMPLE NO. 2

Fluorinated Acrylic Polysiloxane Resin Composition

A fluorinated acrylic polysiloxane resin composition was prepared by combining approximately 120 g of an alkylalkoxy siloxane (Silres MSE 100), 25 g of a first arylalkoxy silane (Z-6124), 5 g of an organometallic catalyst (NIAX U-220), and 20 g of aminosilane (Z6020) to form a first mixture. The first mixture was heated to a temperature of approximately 150° F. and mixed for a period of about 30 minutes. Approximately 60 g of an alkylalkoxy silane (A-163 and Z6070), 95 g of a second arylalkoxy silane (SY-201), and 180 g of an alkoxy-functional silicone intermediate (DC3074 and SY-231) was added to the first mixture and refluxed for about one hour at a temperature of approximately 180° F.

Approximately 30 g of a second alkoxy-functional silicone intermediate (DC6-2230), 30 g of a first organic solvent (PM Acetate), and 20 g of a second organic solvent (butyl acetate) were preblended and slowly added to the refluxed mixture. Approximately 190 g of an acrylic resin (CDX-588), 40 g of a hydroxy-functional silicone intermediate (Q1-2530), 100 g of 2,2,2-trifluoroethanol, and 2 g of the organometallic catalyst were added to the mixture and the mixture was refluxed for a period of approximately two hours at a temperature of 180° F. to form a clear fluorinated acrylic polysiloxane resin composition.

EXAMPLE NO. 2A

Fluorinated Acrylic Polysiloxane Resin Composition

A fluorinated acrylic polysiloxane resin composition was prepared in the manner described above in Example No. 2, except that the approximately 60 g of an alkylalkoxy silane (A-163 and Z6070) was replaced with 70 g of fluorinated silane (Q3-9030) for purposes of achieving further improvement in abrasion and weather resistance.

EXAMPLE NO. 3

Fluorinated Epoxy Polysiloxane Resin Composition

A fluorinated epoxy polysiloxane epoxy resin composition was prepared by combining approximately 145 g of 2,2,2-trifluoroethanol, 300 g of an alkoxy-functional silicone intermediate (SY-231), 10 g of a first organometallic catalyst (NIAX U-220) together, and heating the mixture to a temperature of approximately 180° F. for one hour. The mixture was cooled to a temperature of about 120° F., and approximately 20 g of an alkylalkoxy silane (A-163 and Z6070), 140 g of an alkylalkoxy siloxane (Silres MSE 100), and 200 g of an epoxy resin (Eponex 1510) were added to the mixture. The mixture was mixed until uniform and was again cooled to a temperature of about 120° F. Approximately 15 g of second organometallic catalyst (METACURE T-l) and 100 g of an aminosilane (A1100) curing agent were added to mixture and mixed until uniform to form a fluorinated epoxy polysiloxane resin composition.

EXAMPLE NO. 4

Fluorinated Epoxy Polysiloxane Resin Composition

A fluorinated epoxy polysiloxane resin composition was prepared by combining approximately 200 g of 2,2,2-trifluoroethanol, 350 g of an alkoxy-functional silicone intermediate (SY-321), 25 g of an alkylalkoxy silane (A-1 63 and Z6070), 200 g epoxy resin (Eponex 1510), mixing the ingredients until uniform, and cooling the mixture to about 120° F. Approximately 10 g of organometallic catalyst (METACURE T-1) and 80 g of an aminosilane (A1100) was added to the mixture and mixed until uniform to form a fluorinated epoxy polysiloxane resin composition.

EXAMPLE NO. 5

Fluorinated Epoxy Polysiloxane Resin Composition

A fluorinated epoxy polysiloxane resin composition was prepared by combining approximately 200 g of hexafluoropropanol, 350 g of an alkoxy-functional silicone intermediate (SY-231), 25 g of an alkylalkoxy silane (A-163 and Z6070), 200 g epoxy resin (Eponex 1510), mixing the ingredients until uniform, and cooling the mixture to about 120° F. Approximately 10 g of organometallic catalyst (METACURE T-1) and 80 g of an aminosilane (A1100) was added to the mixture and mixed until uniform to form a fluorinated epoxy polysiloxane resin composition.

EXAMPLE NO. 6

Chlorinated Epoxy Polysiloxane Resin Composition

A chlorinated epoxy polysiloxane resin composition was prepared by combining approximately 145 g of trichloroethanol, 400 g of an alkoxy-functional silicone intermediate (SY-231), 20 g of an alkylalkoxy silane (A-163 and Z6070), 200 g of an epoxy resin (Eponex 1510), mixing the ingredients until uniform, and cooling the mixture to about 120° F. Approximately 10 g of an organometallic catalyst (METACURE T-1) and 80 g of an aminosilane (A1100) was added to the mixture and mixed until uniform to form a chlorinated epoxy polysiloxane resin composition.

EXAMPLE NO. 7

Fluorinated Polysiloxane Epoxy Resin Composition

A fluorinated epoxy polysiloxane resin composition was prepared by combining approximately 190 g of a fluoroalcohol (Zonyl BA-L), 350 g of an alkoxy-functional silicone intermediate (SY-231), 20 g of an alkylalkoxy silane (A-163 and Z6070), 200 g epoxy resin (Eponex 1510), mixing the ingredients until uniform, and cooling the mixture to about 120° F. Approximately 10 g of an organometallic catalyst (METACURE T-1) and 80 g of aminosilane (A1100) was added to the mixture and mixed until uniform to form fluorinated epoxy polysiloxane resin composition.

EXAMPLE NO. 8

Fluorinated Epoxy Polysiloxane Resin Composition

A fluorinated epoxy polysiloxane resin composition was prepared by combining approximately 200 g of a heptafluoropropanol, 350 g of an alkoxy-functional silicone intermediate (SY-231), 20 g of an alkylalkoxy silane (A-163 and Z6070), 200 g epoxy resin (Eponex 1510), mixing the ingredients until uniform, and cooling the mixture to about 120° F. Approximately 10 g of organometallic catalyst (METACURE T-l) and 80 g of aminosilane (A1100) was added to the mixture and mixed until uniform.

Drawdowns of Example 3–8 compositions were prepared at a wet thickness of approximately eight millimeters on Bonderite 1000 treated steel panels and allowed to cure for approximately seven days at 77° F. and 50 percent relative humidity before testing. Each of the example compositions displayed a dry to touch time of less than about 10 hours, with the dry to touch time being less than about 7 hours for half of the examples. The examples were tested for chemical resistance by exposing the drawdowns to a variety of acids and bases, with Examples 3–6 and 8 exhibiting excellent chemical resistance. The examples were also tested for weather resistance by measuring the 63 percent gloss retention by exposing the drawdowns to ultraviolet exposure for a period of up to 24 weeks. Examples 3–6 and 8 exhibited excellent gloss retention for QUV accelerated exposure for up to about 8 weeks.

Halogenated polysiloxane resin compositions prepared according to principles of this invention display excellent properties of chemical, corrosion, weather and ultraviolet resistance when compared to halogenated resin compositions that are prepared by conventional methods relying on the use of halogen acids. For example, when tested for specular gloss measured in accordance with ASTM D 523 using a 60° gloss meter, cured fluorinated acrylic polysiloxane resin compositions prepared according to Example No. 1 of this invention displayed superior properties of initial specular gloss and specular gloss over a period of 85 days when compared against polyvinylidene fluoride "PVDF".

Specifically, the Example No. 1 composition of this invention displayed an initial specular gloss value of approximately 80 (high gloss) compared to a value of approximately 38 (medium gloss) for PVDF. Accordingly, the Example No. 1 composition displayed more than two time the specular gloss of the PVDF product. After approximately 20 days, the Example No. 1 composition displayed a specular gloss value of approximately 72 and a percent gloss retention of approximately 92 percent, while the PVDF product displayed a gloss value of approximately 32 and a percent gloss retention of approximately 94 percent.

After approximately 48 days, the Example No. 1 composition displayed a specular gloss value of approximately 70 and a percent gloss retention of approximately 90 percent, while the PVDF product displayed a gloss value of approximately 28 and a percent gloss retention of approximately 90 percent. After approximately 85 days, the Example No. 1 composition displayed a specular gloss value of approximately 68 and a percent gloss retention of approximately 88 percent, while the PVDF product displayed a gloss value of approximately 28 and a percent gloss retention of approximately 90 percent. Thus, after 85 days the Example No. 1 composition displayed a specular gloss value of almost two and one half times that of the PVDF product.

The specular gloss test illustrates that halogenated polysiloxane resin compositions of this invention have superior properties of gloss when compared to conventional halogenated resin compositions, and continue to maintain such superior gloss after long periods of time much better than such conventional compositions. The superior gloss retention is attributed to the improved weather and ultraviolet resistance of halogenated polysiloxane resin compositions of this invention.

Table 2 sets forth test data gathered from comparative tests, conducted according to the standards of AAMA 605.2, that were run on Example Nos. 1 and 1A and the PVDF product. The tests illustrate that coatings formed from halogenated polysiloxane resin compositions prepared according to principles of this invention (Example Nos. 1 and 1A) exhibit superior specular gloss, superior abrasion resistance, superior humidity resistance, and superior gloss retention when compared to coatings formed from the PVDF product.

TABLE 2

Miscellaneous Test Results

| Test | AAMA 605.2 | Results of Examples 1 & 1A | Results PVDF Product |
|---|---|---|---|
| Color Uniformity | 7.1 | Color uniformity within range | Color uniformity within range |
| Specular Gloss | 7.2 | 60 degree gloss = 76 | 60 degree gloss = 32 |
| Dry Film Hardness | 7.3 | No rupture of film at grade F | No rupture of film at grade F |
| Film adhesion | 7.4.1.1 | Dry adhesion. No removal of film | Dry adhesion. No removal of film |
| Film adhesion | 7.4.1.2 | Wet adhesion. No removal of film | Wet adhesion. No removal of film |
| Film adhesion | 7.4.1.3 | Boiling water adhesion. No removal of film | Boiling water adhesion. No removal of film |
| Impact resistance | 7.5 | No removal of film at minimum deformation of 0.1 +/− 0.01 | No removal of film at minimum deformation of 0.1 +/− 0.01 |
| Abrasion resistance | 7.6 | Abrasion coefficient >40, actual = 94 | Abrasion coefficient >40, actual = 70–80 |
| Chemical resistance | 7.7.1 | Muriatic acid resistance. 15 minute spot test. No blistering or visual change in appearance | Muriatic acid resistance. 15 minute spot test. No blistering or visual change in appearance |
| Chemical resistance | 7.7.2 | Mortar resistance (24 hrs pate test) | Mortar resistance (24 hrs pate test) |
| Resistance to acid pollutants | 7.7.3 | Color changes must be less than 5E units (actual results = 0.5) | Color changes must be less than 5E units (actual results = 0.4) |
| Detergent resistance | 7.7.4 | No loss of adhesion or blistering | No loss of adhesion or blistering |
| Corrosion resistance | 7.8.1 | Humidity resistance. No more than a few 8F blisters after 3,000 hrs in Cleveland humidity cabinet (ASTM D2247) | Humidity resistance. 8D and 6–5F blisters after 3,000 hrs in Cleveland humidity cabinet (ASTM D2247) |
| Corrosion resistance | 7.8.2 | Salt spray resistance. 3,000 hrs in a salt spray cabinet (ASTM B117). Meets minimum scribe rating of 7 and minimum blister rating of 8 | Salt spray resistance. 3,000 hrs in a salt spray cabinet (ASTM B117). Meets minimum scribe rating of 7 and minimum blister rating of 8 |
| Weathering | 7.9.1 | EMMAQUA-NTW test performed at DSET laboratories, Phoenix, Arizona in accordance with ASTM D4141-93, procedure C: Exposure start-9/9/95; Exposure stop-10/10/96; Total radiant exposure (MJ/m2)-55517.35; Total radiant exposure (lys)-13,268,997; UV radiant exposure (MJ/m2)-1,400; Days exposure-368; Delta E-0.82 | EMMAQUA-NTW test performed at DSET laboratories, Phoenix, Arizona in accordance with ASTM D4141-93, procedure C: Exposure start-9/9/95; Exposure stop-10/10/96; Total radiant exposure (MJ/m2)-55517.35; Total radiant exposure (lys)-13,268,997; UV radiant exposure (MJ/m2)-1,400; Days exposure-368; Delta E-2.38 |

Halogenated polysiloxane resin compositions of this invention can be used with a variety of substrates such as steel, masonry, plastic, and the like and cure under ambient temperature conditions without need for special curing conditions or special equipment. The compositions are quick curing, curing completely at ambient temperature and above fifty percent relative humidity in less than about 10 hours, and may be applied by cloth, spray, brush, or roll without the need for thinning or using special application techniques or equipment.

In addition to protective coatings, halogenated polysiloxane resin compositions of this invention can be used in the construction of composites such as fiber-reinforced plastics, in the form of moldings, sections and the like used in the automotive, mass transit, building and construction, aerospace and defense, and mining and tunneling industries, to provide improved properties of flexibility, impact resistance, and toughness. Specific examples of such composites include pipes 10 having reinforcing fibers or filaments, as illustrated in the enclosed FIGURE. Such pipes can be formed from windings of filament formed from glass, Kevlar (aromatic polyamide), carbon, graphite or the like, or combinations thereof, that are bonded together with halogenated polysiloxane resin compositions of this invention.

Although limited embodiments of halogenated polysiloxane resin compositions have been described herein, many modifications and variations will be apparent to those skilled in the art. Accordingly, it is to be understood that, within the scope of the appended claims, halogenated polysiloxane resin compositions according to principles of this invention may be prepared other than as specifically described herein.

What is claimed is:

1. A halogenated polysiloxane resin composition prepared by combining:
   at least one silicone intermediate; with
   a resin selected from the group consisting of hydroxy- and epoxy-functional resins; and
   an organic halogen-containing ingredient having at least one functional group selected from the group consisting of hydroxy, amine, and carboxyl groups;
   wherein the silicone intermediate, resin, and halogen-containing ingredient undergo condensation reactions to form a cross-linked halogenated polysiloxane resin network without the use of inorganic halogen acids.

2. The composition as recited in claim 1 wherein the at least one silicone intermediate is selected from the group consisting of hydroxy- and alkoxy-functional silicone intermediates having the formula

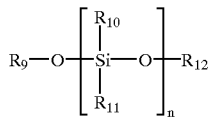

where each $R_{10}$ and $R_{11}$ group is independently selected from the group consisting of the hydroxy group, alkyl, aryl and alkoxy groups having up to six carbon atoms, where each $R_9$ and $R_{12}$ group is independently selected from the group consisting of hydrogen, and alkyl, and aryl groups having up to 12 carbon atoms, and where n is selected so that the weight average molecular weight of the silicone intermediate is in the range of from about 100 to 10,000.

3. The composition as recited in claim 1 wherein such silicone intermediate has the formula

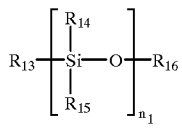

where $R_{13}$ is selected from the group consisting of alkyl, aryl, and alkoxy groups, where $R_{14}$ and $R_{15}$ are selected from the group consisting of the alkyl, aryl, and alkoxy groups, where $R_{16}$ is selected from the alkyl group, and where $n_1$ is selected so that the siloxane resin has a weight average molecular weight in the range of from about 500 to 5,000.

4. The composition as recited in claim 1 further comprising a silane selected from the group consisting of alkylalkoxy silanes, arylalkoxy silanes, halogenated silanes, and mixtures thereof.

5. The composition as recited in claim 1 wherein in the range of from 5 to 25 percent by weight of the organic halogen-containing ingredient based on the total weight of the composition is used to prepare the composition.

6. The composition as recited in claim 1 further comprising an amine curing agent having the formula

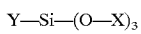

where Y is $H(HNR_{17})_a$ and "a" is an integer in the range of from about two to seven, where each $R_{17}$ is a difunctional organic radical independently selected from the group consisting of aryl, alkyl, dialkylaryl, alkoxyalkyl, and cycloalkyl radicals, where $R_{17}$ can vary within each Y molecule, and where each X can be the same or different and is selected from the group consisting of alkyl, hydroxalkyl, alkoxyalkyl and hydroxyalkoxyalkyl groups containing less than about six carbon atoms.

7. The composition as recited in claim 2 further comprising a catalyst selected from the group consisting of organometallic compounds, acids, bases, and mixtures thereof.

8. The composition as recited in claim 1 wherein in the range of from 10 to 70 percent by weight of the silicone intermediate, 10 to 70 percent by weight of the resin, and 5 to 25 percent by weight of the organic halogen-containing ingredient based on the total weight of the composition is used to prepare the composition.

9. A composite having a resin component comprising a halogenated polysiloxane resin composition prepared according to claim 1.

10. A halogenated polysiloxane resin composition prepared by combining:
   at least one silicone intermediate selected from the group consisting of hydroxy- and alkoxy-functional silicone intermediates; with
   at least one silane selected from the group consisting of arylalkoxy silanes, alkylalkoxy silanes, halogenated silanes, and mixtures thereof;
   an organic halogen-containing ingredient having functional groups selected from the group consisting of hydroxy, amine, and carboxyl groups;
   a resin selected from the group consisting of hydroxy- and epoxy-functional resins; and
   at least one curing agent selected from the group consisting of tertiary amines, aminosilanes, organometallic compounds, acids, bases, and mixtures thereof;
   wherein the halogen-containing ingredient, silicone intermediate, silane, and resin undergo condensation reactions to form a cross-linked halogenated polysiloxane resin network without the use of inorganic halogen acids.

11. The composition as recited in claim 10 wherein such silicone intermediate has the formula

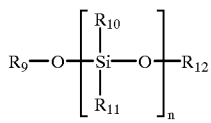

where each $R_{10}$ and $R_{11}$ group is independently selected from the group consisting of the hydroxy group, alkyl, aryl and alkoxy groups having up to six carbon atoms, where each $R_9$ and $R_{12}$ group is independently selected from the group consisting of hydrogen, and alkyl, and aryl groups having up to 12 carbon atoms, and where n is selected so that the weight average molecular weight of the silicone intermediate is in the range of from about 100 to 10,000.

12. The composition as recited in claim 11 wherein in the range of from about 10 to 70 percent by weight of the silicone intermediate based on the total weight of the composition is used to prepare the composition.

13. The composition as recited in claim 10 wherein such silicone intermediate has the formula

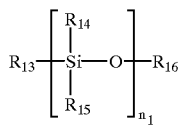

where $R_{13}$ is selected from the group consisting of alkyl, aryl, and alkoxy groups, where $R_{14}$ and $R_{15}$ are selected from the group consisting of the alkyl, aryl, and alkoxy groups, where $R_{16}$ is selected from the alkyl group, and where n, is selected so that the siloxane resin has a weight average molecular weight in the range of from about 500 to 5,000.

14. The composition as recited in claim 10 wherein the arylalkoxy silanes has the formula

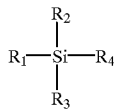

where $R_1$ is an aryl group, where each $R_2$, $R_3$ and $R_4$ group is an alkoxy group having less than about four carbon atoms, and has an average molecular weight in the range of from about 150 to 300.

15. The composition as recited in claim 10 wherein the alkoxyalkyl silanes have the formula

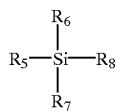

where $R_5$ is an alkyl group having less than four carbon atoms, where each $R_6$, $R_7$ and $R_8$ is an alkoxy group having less than four carbon atoms, and has an average molecular weight in the range of from 100 to 300.

16. The composition as recited in claim 10 wherein the organic halogen-containing ingredient is selected from the group consisting of halogen-containing alcohols, and wherein in the range of from 5 to 25 percent by weight of the organic halogen-containing ingredient based on the total weight of the composition is used to prepare the composition.

17. The composition as recited in claim 10 wherein the resin is selected from the group of hydroxy- and epoxy-functional resins consisting of epoxy resins, acrylic resins, polyester resins, phenolic resins, phenolic silane resins, and mixtures thereof.

18. The composition as recited in claim 17 wherein in the range of from about 10 to 70 percent by weight of the resin based on the total weight of the composition is used to prepare the composition.

19. The composition as recited in claim 10 wherein the aminosilane curing agent has the formula

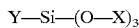

where Y is $H(HNR_{17})_a$ and "a" is an integer in the range of from about two to seven, where each $R_{17}$ is a difunctional organic radical independently selected from the group consisting of aryl, alkyl, dialkylaryl, alkoxyalkyl, and cycloalkyl radicals, where $R_{17}$ can vary within each Y molecule, and where each X can be the same or different and is selected from the group consisting of alkyl, hydroxalkyl, alkoxyalkyl and hydroxyalkoxyalkyl groups containing less than about six carbon atoms.

20. A composite having a resin component comprising the composition prepared according to claim 10.

21. A halogen-containing polysiloxane resin composition prepared by combining:

at least one silicone intermediate selected from the group consisting of hydroxy- and alkoxy-functional silicone intermediates having the formula

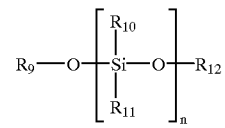

where each $R_{10}$ and $R_{11}$ group is independently selected from the group consisting of the hydroxy group, alkyl, aryl and alkoxy groups having up to six carbon atoms, where each $R_9$ and $R_{12}$ group is independently selected from the group consisting of hydrogen, and alkyl, and aryl groups having up to 12 carbon atoms, and where n is selected so that the weight average molecular weight of the silicone intermediate is in the range of from about 100 to 10,000 an organic halogen-containing compound selected from the group consisting of alcohols, amines, and carboxylic acids;

at least one silane selected from the group consisting of arylalkoxy silanes, alkylalkoxy silanes, halogenated silanes, and mixtures thereof;

a resin selected from the group consisting of acrylic resins, polyester, epoxy, phenolic resins, and phenolic silane resins;

an amine curing agent; and a catalyst selected from the group consisting of organometallic compounds, acids, bases, and mixtures thereof;

wherein the halogen-containing ingredient, silicone intermediate, silane and undergo condensation reactions to form a cross-linked halogenated polysiloxane network, and wherein the resin reacts with the cross-linked halogenated polysiloxane composition to form a cross-linked halogenated polysiloxane resin network without the use of inorganic halogen acids.

22. The composition as recited in claim 21 wherein the organic halogen-containing compound is a halogenated alcohols having in the range of from about one to ten carbon atoms.

23. The composition as recited in claim 22 wherein in the range of from about 5 to 25 percent by weight of the halogenated alcohol based on the total weight of the composition is used to prepare the composition.

24. The composition as recited in claim 21 wherein such silicone intermediate has the formula

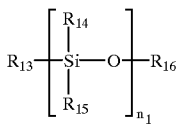

where $R_{13}$ is selected from the group consisting of alkyl, aryl, and alkoxy groups, where $R_{14}$ and $R_{15}$ are selected from the group consisting of the alkyl, aryl, and alkoxy groups, where $R_{16}$ is selected from the alkyl group, and where n, is selected so that the siloxane resin has a weight average molecular weight in the range of from about 500 to 5,000.

25. The composition as recited in claim 21 wherein the amine curing agent is an aminosilane having the formula

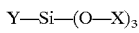

where Y is $H(HNR_{17})_a$ and "a" is an integer in the range of from about two to seven, where each $R_{17}$ is a difunctional organic radical independently selected from the group consisting of aryl, alkyl, dialkylaryl, alkoxyalkyl, and cycloalkyl radicals, where $R_{17}$ can vary within each Y molecule, and where each X can be the same or different and is selected from the group consisting of alkyl, hydroxyalkyl, alkoxyalkyl and hydroxyalkoxyalkyl groups containing less than about six carbon atoms.

26. A composite having a resin component comprising the composition prepared according to claim 21.

27. A method for halogenating a polysiloxane resin composition comprising the steps of:
    combining:
        at least one silicone intermediate; with
        an organic halogen-containing ingredient having functionality selected from the group consisting of amine, hydroxy, and carboxyl groups; and
        a resin selected from the group consisting of hydroxy- and epoxy functional resins to form a mixture; and
    reacting the mixture to form a cross-linked halogenated polysiloxane resin network without the use of an inorganic halogen acid.

28. The method as recited in claim 27 further comprising, before the step of reacting, adding a silicone intermediate selected from the group of alkylalkoxy siloxanes.

29. The method as recited in claim 27 further comprising, before the step of reacting, adding a silane selected from the group consisting of alkylalkoxy silanes, arylalkoxy silanes, halogenated silanes, and mixtures thereof.

30. The method as recited in claim 27 further comprising, before the step of reacting adding an amine curing agent.

31. The method as recited in claim 30 further comprising, before the step of reacting, adding a catalyst selected from the group consisting of organometallic compounds, acids, bases, and mixtures thereof to form an ambient curing halogenated polysiloxane resin composition.

32. A method for forming a halogenated polysiloxane resin composition comprising the steps of:
    combining:
        at least one silicone intermediate selected from the group consisting of hydroxy- and alkoxy-functional silicone intermediates; with
        an organic halogen-containing ingredient having functionality selected from the group consisting of amine, hydroxy, and carboxyl groups;
        at least one silane selected from the group consisting of arylalkoxy silanes, alkylalkoxy silanes, and halogenated silanes; and
        a resin selected from the group consisting of hydroxy- and epoxy-functional resins to form a mixture; and
    reacting the mixture to form a cross-linked halogenated polysiloxane resin network.

33. The method as recited in claim 32 further comprising, before the step of reacting, adding an amine curing agent and a catalyst selected from the group consisting of organometallic compounds, acids, bases, and mixtures thereof to facilitate the reacting step and to promote ambient temperature cure.

34. The method as recited in claim 32 further comprising the step of curing the halogenated polysiloxane resin composition at ambient temperature upon exposure to moisture.

35. A method for introducing halogenation into a resin composition comprising the steps of:
    forming a halogenated organooxysilane by combining one or more silicone intermediate selected from the group consisting of hydroxy- and alkoxy-functional silicone intermediates, with a silane and an organic halogen-containing ingredient having hydroxy functionality and allowing the combined ingredients to undergo polycondensation to form a cross-linked halogenated organooxysilane; and
    condensing the halogenated organooxysilane with a resin selected from the group consisting of hydroxy- and epoxy-functional resins to form a halogenated cross-linked polysiloxane resin network.

36. A halogenated polysiloxane resin composition prepared without the use of an inorganic halogen acid by combining:
    at least one silicone intermediate selected from the group consisting of hydroxy- and alkoxy-functional silicone intermediates in the range of from 10 to 70 percent by weight of the total composition; with
    at least one silane selected from the group consisting of arylalkoxy silanes, alkylalkoxy silanes, halogenated silanes, and mixtures thereof in the range of from 0 to about 45 percent by weight of the total composition;
    an organic halogen-containing ingredient having functional groups selected from the group consisting of hydroxy, amine, and carboxyl groups in the range of from 5 to 25 percent by weight of the total composition;
    a resin selected from the group consisting of hydroxy- and epoxy-functional resins in the range of from 10 to 70 percent by weight of the total composition;
    at least one curing agent selected from the group consisting of tertiary amines, aminosilanes, organometallic compounds, acids, bases, and mixtures thereof in the range of from 0 to about 20 percent by weight of the total composition;
    organic solvent in the range of from 0 to about 10 percent by weight of the total composition; and
    fillers, pigments, and additives in the range of from 0 to about 50 percent by weight of the total composition.

* * * * *